United States Patent
Sota et al.

(10) Patent No.: US 11,157,753 B2
(45) Date of Patent: Oct. 26, 2021

(54) ROAD LINE DETECTION DEVICE AND ROAD LINE DETECTION METHOD

(71) Applicants: TOYOTA JIDOSHA KABUSHIKI KAISHA, Toyota (JP); DENSO CORPORATION, Kariya (JP)

(72) Inventors: Takahiro Sota, Yokohama (JP); Jia Sun, Tokyo-to (JP); Masataka Yokota, Tokyo-to (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 91 days.

(21) Appl. No.: 16/658,753

(22) Filed: Oct. 21, 2019

(65) Prior Publication Data

US 2020/0125861 A1 Apr. 23, 2020

(30) Foreign Application Priority Data

Oct. 22, 2018 (JP) .............................. JP2018-198391

(51) Int. Cl.
*G06K 9/62* (2006.01)
*G05D 1/02* (2020.01)
*G06K 9/00* (2006.01)

(52) U.S. Cl.
CPC ....... *G06K 9/00798* (2013.01); *G05D 1/0246* (2013.01); *G06K 9/6212* (2013.01)

(58) Field of Classification Search
None
See application file for complete search history.

(56) References Cited

U.S. PATENT DOCUMENTS

| | | | | |
|---|---|---|---|---|
| 2006/0206243 A1* | 9/2006 | Pawlicki | ............ | G06K 9/00825 701/1 |
| 2008/0231703 A1* | 9/2008 | Nagata | .................... | H04N 7/181 348/148 |
| 2016/0048733 A1* | 2/2016 | Jung | .................. | G06K 9/00798 382/104 |
| 2016/0055383 A1* | 2/2016 | Akamine | ............... | G06K 9/033 382/104 |

(Continued)

OTHER PUBLICATIONS

Jiman Kim et al., "End-to-End Ego Lane Estimation based on Sequential Transfer Learning for Self-Driving Cars", 2017 IEEE Conference on Computer Vision and Pattern Recognition Workshops, 2017, pp. 30-38.

*Primary Examiner* — Idowu O Osifade
(74) *Attorney, Agent, or Firm* — Sughrue Mion, PLLC

(57) ABSTRACT

A road line detection device includes a processor configured to: calculate, for each pixel of an image acquired by a camera mounted on a vehicle, a confidence score that a road line is represented in the pixel, and a confidence score that another object is represented in the pixel; set a correction region in a range assumed to include a road line in the image during changing lanes; correct, for each pixel included in the correction region, the confidence score for a road line or the confidence score for another object in such a way that the confidence score for a road line is high relative to the confidence score for another object; and detect a road line from the image based on each pixel in which the confidence score for a road line is higher than the confidence score for another object.

3 Claims, 6 Drawing Sheets

(56) References Cited

U.S. PATENT DOCUMENTS

| | | | | |
|---|---|---|---|---|
| 2016/0110616 A1* | 4/2016 | Kawasaki | .......... | G06K 9/00798 |
| | | | | 382/103 |
| 2016/0347323 A1* | 12/2016 | Yoshitomi | ............. | B60W 40/04 |
| 2017/0147889 A1* | 5/2017 | Okano | .................... | G06K 9/209 |
| 2019/0347491 A1* | 11/2019 | Kurian | ....................... | G06T 7/12 |
| 2020/0026960 A1* | 1/2020 | Park | ..................... | G06K 9/6218 |

* cited by examiner

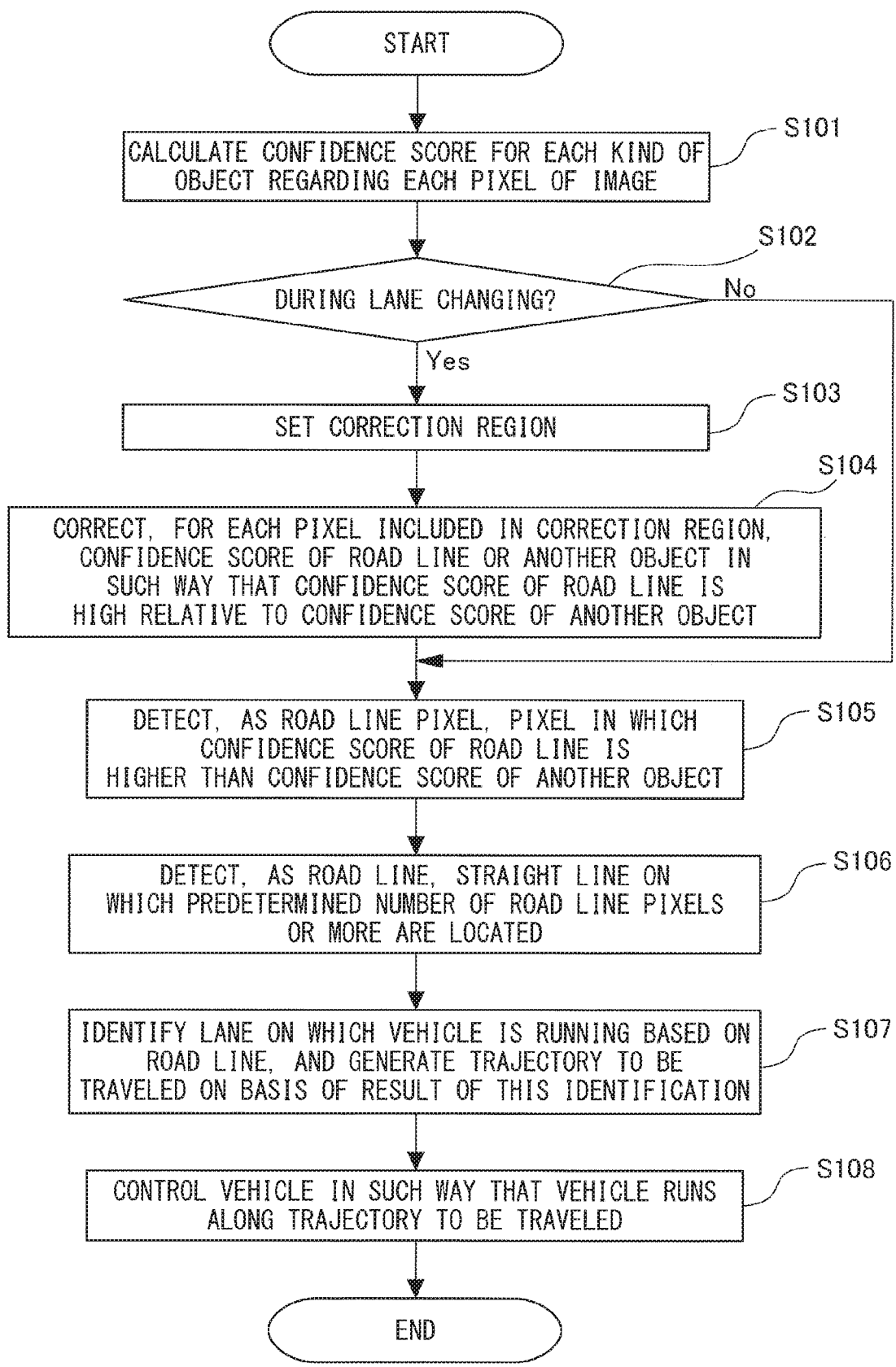

ROAD LINE DETECTION DEVICE AND ROAD LINE DETECTION METHOD

FIELD

The present invention relates to a road line detection device and a road line detection method that detect a road line marked on a road.

BACKGROUND

In driving support or automatic driving control of vehicles, it is preferable that a vehicle can identify a lane on which the vehicle is running. Thus, a technique for detecting a road line (for example, lane division line for representing a lane) marked on a road by inputting an image acquired by photography with a camera mounted on a vehicle to a classifier for segmentation that outputs, for each pixel, a kind of an object represented by the pixel has been proposed (e.g., refer to Jiman Kim et al., "End-to-End Ego Lane Estimation based on Sequential Transfer Learning for Self-Driving Cars", 2017 IEEE Conference on Computer Vision and Pattern Recognition Workshops, 2017).

SUMMARY

On a road, road signs such as pedestrian crossing and speed limit are represented, in addition to a road line. Thus, a classifier may erroneously recognize other road signs as a road line.

Therefore, an object of the present invention is to provide a road line detection device capable of improving accuracy in detection of a road line marked on a road.

According to one embodiment, a road line detection device is provided. This road line detection device includes a processor configured to: input an image acquired by a camera mounted on a vehicle to a classifier that calculates, for each pixel of the image and for each object, a confidence score representing likelihood that the object is represented in the pixel, to calculate, for each pixel of the image, a confidence score that an object represented in the pixel is a road line, and a confidence score that the object is another object; set a correction region in a range assumed to include a road line in the image when the vehicle changes lanes; correct, for each pixel included in the correction region, the confidence score for a road line or the confidence score for another object in such a way that the confidence score for a road line is high relative to the confidence score for another object; detect, among the respective pixels of the image, a pixel in which the confidence score for a road line is higher than the confidence score for another object, and detect, as a road line, a straight line on which detected pixels are arranged.

In this road line detection device, it is preferable that the processor is further configured to set a position and a range of the correction region on the image depending on a position relationship between a road line crossed by the vehicle when the vehicle changes lanes, and the vehicle.

According to another embodiment of the present invention, a road line detection method is provided. This road line detection method includes: inputting an image acquired by an imaging unit mounted on a vehicle to a classifier that calculates, for each pixel of the image and for each object, a confidence score representing likelihood that the object is represented in the pixel, to calculate, for each pixel of the image, a confidence score that an object represented in the pixel is a road line, and a confidence score that the object is another object; setting a correction region in a range assumed to include a road line in the image when the vehicle changes lanes; correcting, for each pixel included in the correction region, the confidence score for a road line or the confidence score for another object in such a way that the confidence score for a road line is high relative to the confidence score for another object; detecting, among the respective pixels of the image, a pixel in which a confidence score for a road line is higher than the confidence score for another object, and detecting, as a road line, a straight line on which detected pixels are arranged.

A road line detection device according to the present invention provides an advantageous effect of being able to improve accuracy in detection of a road line marked on a road.

BRIEF DESCRIPTION OF DRAWINGS

FIG. 6 is a flowchart illustrating an operation of vehicle control processing including road line detection processing.

DESCRIPTION OF EMBODIMENTS

A road line detection device will be described below with reference to the drawings. This road line detection device inputs an image acquired by a camera mounted on a vehicle and representing periphery of the vehicle to a classifier for segmentation, and thereby detects a road line marked on a road in the image. The classifier for segmentation utilized by this road line detection device has been previously learned so that, for each pixel of an input image, the classifier outputs, for each kind of an object to be identified, a confidence score representing likelihood that the kind of the object is represented in the pixel. The road line detection device determines, for each pixel, that an object for which a confidence score becomes maximum is represented in the pixel.

While road lines are located on both edges of a lane, there is also an object existing near a center of a lane, such as other road signs. Therefore, when a camera is attached in such a way as to direct forward from a vehicle, another object such as another road marking is generally represented nearer a center of an image acquired by a camera mounted on the vehicle running on a lane than a road line in the image. Thus, a large number of teacher images representing other objects nearer a center than a road line are used when a classifier is learned. As a result of using a large number of such teacher images for learning of a classifier, there is a higher possibility that the classifier discriminates an object represented near a center of an image as another object other than a road line. On the other hand, in an image acquired by the camera while the vehicle is changing lanes, a road line may be represented near a center of the image. In such a case, a classifier may erroneously recognize a road line as another object.

Thus, when a vehicle is changing lanes, this road line detection device corrects, for each pixel included in a region in which a road line is assumed to be located on an image, a confidence score for a road line or a confidence score for another object output by the classifier in such a way that the confidence score for a road line is high relative to the confidence score for another object. Consequently, this road line detection device suppresses false recognition of a road line as another object even when a road line is represented near a center of an image, and thus improves accuracy in detection of a road line.

An example in which a road line detection device is applied to a vehicle control system is described below. In this example, a road line detection device detects a road line by executing road line detection processing for an image acquired by a camera mounted on a vehicle, and utilizes the detected road line for drive control of the vehicle.

Figure 1:
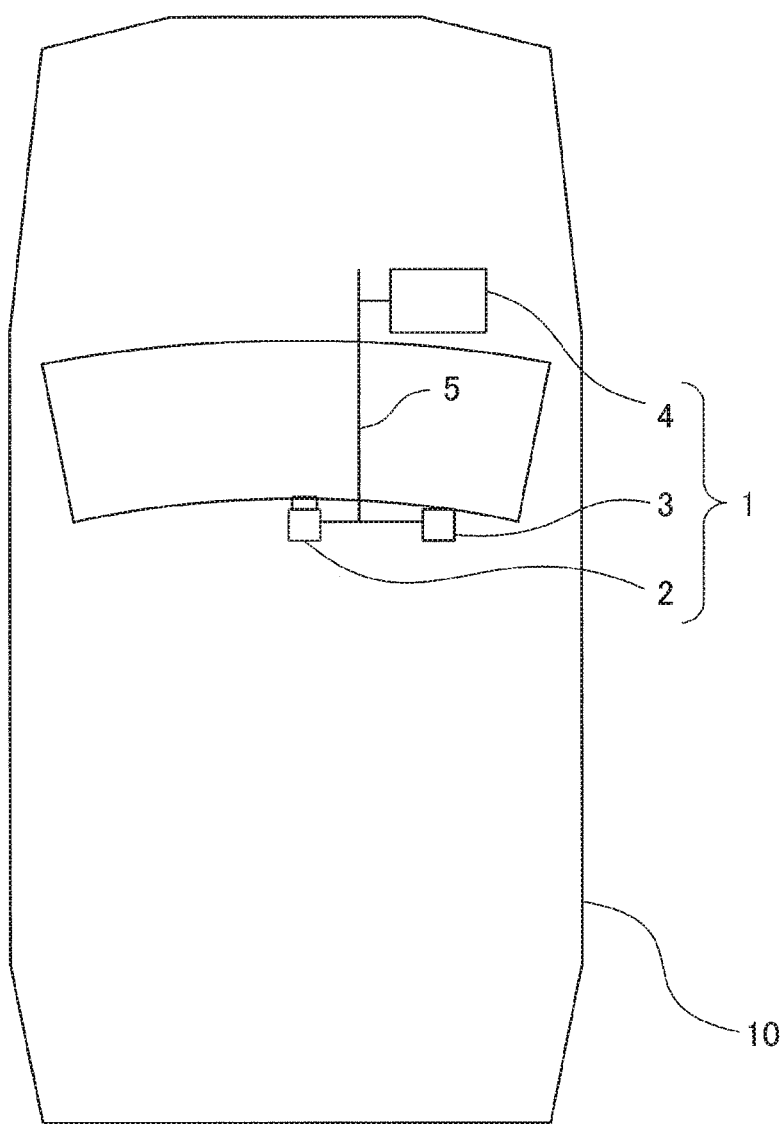
FIG. 1 is a schematic configuration diagram of a vehicle control system on which a road line detection device is mounted.
Figure 2:
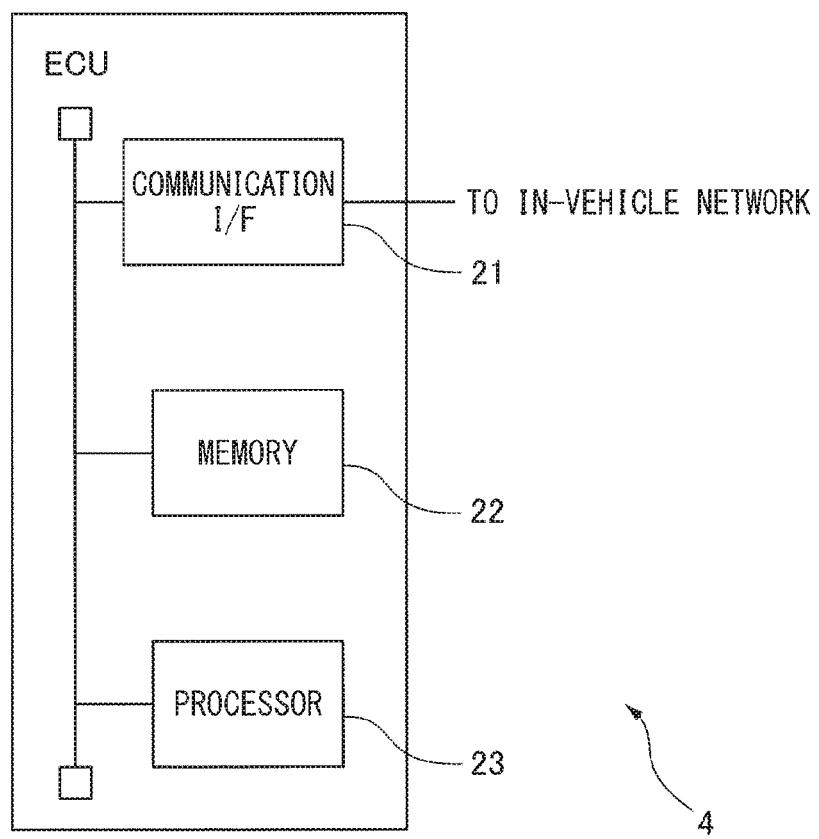
FIG. 2 is a hardware configuration diagram of an electronic control unit being one embodiment of a road line detection device.

FIG. 1 is a schematic configuration diagram of a vehicle control system on which a road line detection device is installed. FIG. 2 is a hardware configuration diagram of an electronic control unit being one embodiment of a road line detection device. In the present embodiment, a vehicle control system 1 which is installed on a vehicle 10 and controls the vehicle 10 includes a camera 2 for imaging the surroundings of the vehicle 10, a positioning information receiver 3, and an electronic control unit (ECU) 4 being one example of a road line detection device. The camera 2, the positioning information receiver 3, and the ECU 4 are communicably connected to one another via an in-vehicle network 5 compliant with a standard such as a controller area network.

The camera 2 is one example of an imaging unit, and includes a two-dimensional detector configured with an array of photoelectric conversion elements sensitive to visible light such as a CCD or a C-MOS, and an imaging optical system which forms an image of a region to be imaged on the two-dimensional detector. The camera 2 is mounted, for example, inside a vehicle room of the vehicle 10 in such a way that it is oriented in a forward direction of the vehicle 10. The camera 2 captures a forward region of the vehicle 10 every predetermined imaging period (e.g., 1/30 seconds to 1/10 seconds), and generates an image representing the forward region. The image acquired by the camera 2 may be a color image or a gray image.

Every time the camera 2 generates an image, the camera 2 outputs the generated image to the ECU 4 via the in-vehicle network 5.

The positioning information receiver 3 is one example of a positioning unit, and acquires positioning information representing a current position of the vehicle 10. For example, the positioning information receiver 3 can be a GPS receiver. Each time the positioning information receiver 3 acquires positioning information, the positioning information receiver 3 outputs the acquired positioning information to the ECU 4 via the in-vehicle network 5.

The ECU 4 controls the vehicle 10. In the present embodiment, the ECU 4 controls the vehicle 10 in such a way as to automatically drive the vehicle 10 on the basis of a road line detected from an image acquired by the camera 2. For this purpose, the ECU 4 includes a communication interface 21, a memory 22, and a processor 23.

The communication interface 21 is one example of a communication unit, and includes an interface circuit for connecting the ECU 4 to the in-vehicle network 5. In other words, the communication interface 21 is connected to the camera 2 and the positioning information receiver 3 via the in-vehicle network 5. Each time the communication interface 21 receives an image from the camera 2, the communication interface 21 transfers the received image to the processor 23. Each time the communication interface 21 receives positioning information from the positioning information receiver 3, the communication interface 21 transfers the received positioning information to the processor 23.

The memory 22 is one example of a storage unit, and includes, for example, a volatile semiconductor memory and a non-volatile semiconductor memory. The memory 22 stores various data used in road line detection processing executed by the processor 23 of the ECU 4, for example, an image received from the camera 2, various parameters serving to identify a classifier utilized in road line detection processing, a correction coefficient for each kind of an object by which a confidence score is multiplied, and the like. Further, the memory 22 may store map information. The map information includes information representing a number of lanes set on a road.

The processor 23 is one example of a control unit, and includes one or a plurality of central processing units (CPUs) and peripheral circuits thereof. The processor 23 may further include another arithmetic circuit such as a logical arithmetic unit, a numerical arithmetic unit, or a graphic processing unit. While the vehicle 10 is running, each time the processor 23 receives an image from the camera 2, the processor 23 executes road line detection processing for the received image. Further, the processor 23 controls the vehicle 10 in such a way as to automatically drive the vehicle 10 on the basis of a road line detected from the received image.

Figure 3:
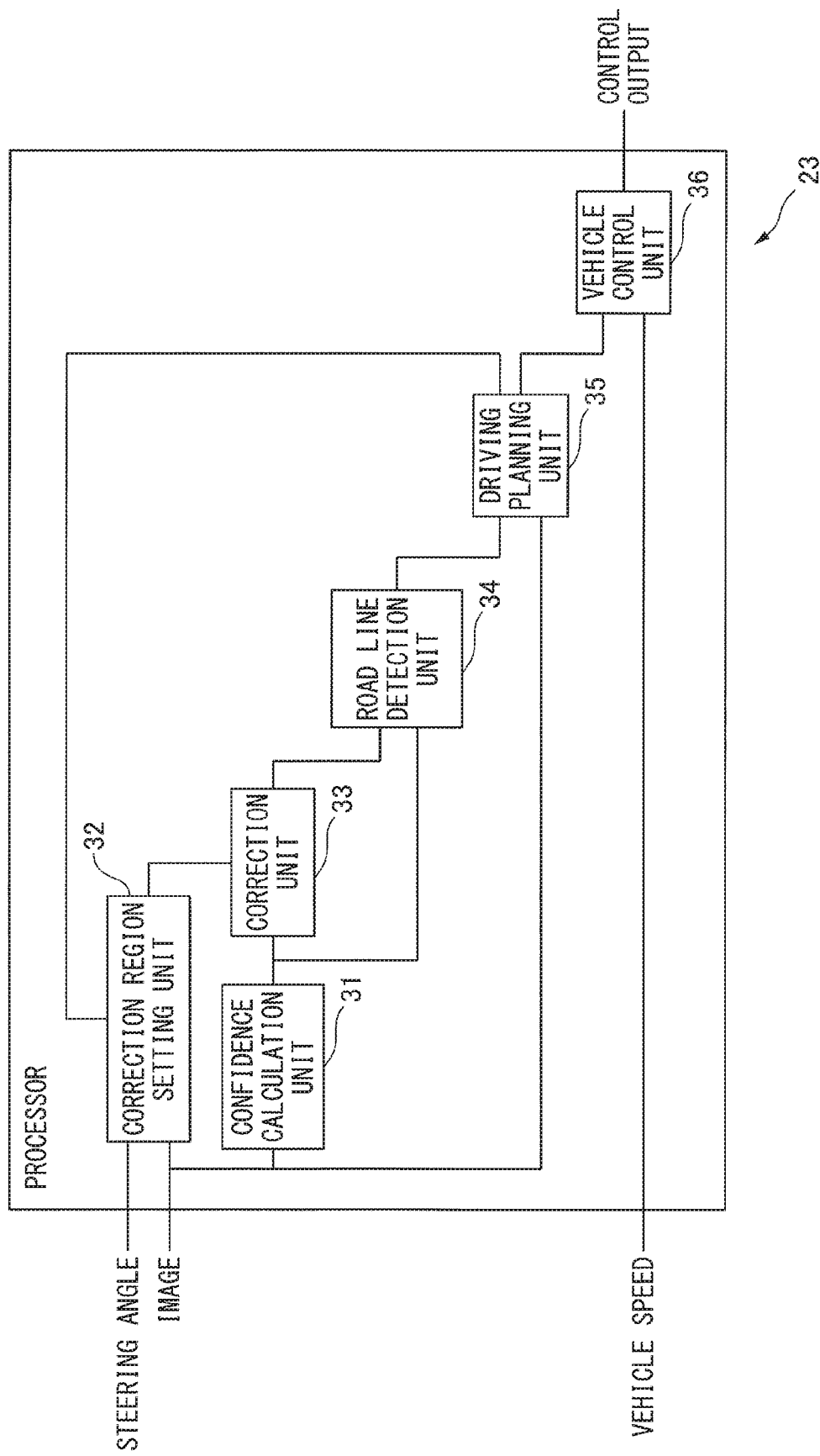
FIG. 3 is a functional block diagram of a processor of the electronic control unit, relating to vehicle control processing including road line detection processing.

FIG. 3 is a functional block diagram of the processor 23 of the ECU 4, relating to vehicle control processing including road line detection processing. The processor 23 includes a confidence calculation unit 31, a correction region setting unit 32, a correction unit 33, a road line detection unit 34, a driving planning unit 35, and a vehicle control unit 36. Each of these units included in the processor 23 is, for example, a function module implemented by a computer program operating on the processor 23. Alternatively, each of these units included in the processor 23 may be a dedicated arithmetic circuit provided in the processor 23. Among the respective units included in the processor 23, the confidence calculation unit 31, the correction region setting unit 32, the correction unit 33, and the road line detection unit 34 execute road line detection processing. Each time an image is acquires from the camera 2, the processor 23 executes road line detection processing for the image. Thus, processing for one image is described below for the confidence calculation unit 31, the correction region setting unit 32, the correction unit 33, and the road line detection unit 34.

The confidence calculation unit 31 inputs an image generated by the camera 2 to a classifier to output, for each pixel of the image and for each kind of an object to be identified, a confidence score representing likelihood that the kind of the object is represented in the pixel.

For example, the confidence calculation unit 31 can use, as the classifier, a deep neural network (DNN) having a convolutional neural network (CNN) architecture for segmentation, such as a fully convolutional network (FCN). Alternatively, the confidence calculation unit 31 may utilize, as the classifier, a Random Forest or a classifier for segmentation in accordance with some other machine learning scheme utilizing a Markov Random Field such as a Conditional Random Field.

Furthermore, the confidence calculation unit 31 may also detect, from an image, another object (e.g., a vehicle, a person, etc.) that may affect running of the vehicle 10 other than a road line candidate pixel, by inputting the image to a classifier, as in the detection of a road line candidate pixel. In this instance, separately from a classifier used to detect a road line candidate pixel, the confidence calculation unit 31 may use a classifier which has been previously learned in such a way as to detect, from an input image, an object represented on the image. As such the classifier, the confidence calculation unit 31 can use a DNN having a convolutional neural network type architecture, such as a Single Shot Multibox Detector (SSD) or a faster R-CNN.

For each pixel of an image, the confidence calculation unit 31 outputs a confidence score for each object to be identified to the correction unit 33 and the road line detection unit 34.

When the correction region setting unit 32 detects that the vehicle 10 changes lanes, the correction region setting unit 32 sets, for each image acquired during a predetermined period from the detection, a correction region that makes a confidence score for a road line high relative to a confidence score for another object. In the present embodiment, the correction region setting unit 32 sets a correction region in a range assumed to include a road line on an image.

With reference to a trajectory to be traveled of the vehicle 10 set by the driving planning unit 35, the correction region setting unit 32 determines whether or not the trajectory to be traveled of the vehicle 10 involves a lane change within a latest predetermined period. When an absolute value of a steering angle received by the processor 23 from a steering angle sensor (not illustrated) is greater than a predetermined threshold value, the correction region setting unit 32 determines that the vehicle 10 changes lanes. Alternatively, with reference to current position information of the vehicle 10 received by the positioning information receiver 3 and map information stored in the memory 22, the correction region setting unit 32 may determine whether or not a road at a current position of the vehicle 10 is a straight line. In a case where a road at a current position of the vehicle 10 is a straight line, the correction region setting unit 32 may determine that the vehicle 10 changes lanes, when an absolute value of a steering angle received by the processor 23 from a steering angle sensor (not illustrated) is greater than a predetermined threshold value. Note that a predetermined period can be, for example, a period required for the vehicle 10 to run in a section where the vehicle 10 is changing lanes on a trajectory to be traveled of the vehicle 10. Alternatively, when a rotation direction of the vehicle 10 indicated by a steering angle becomes reverse to a direction in which the vehicle 10 changes lanes, the correction region setting unit 32 may determine that the predetermined period has ended.

While the vehicle 10 is making a lane change, a road line crossed by the vehicle 10 at the time of the lane change may be located in front of the vehicle 10. Thus, as in the present embodiment, when the camera 2 is attached in such a way as to direct forward from the vehicle 10, the correction region setting unit 32 sets a correction region in such a way as to include vicinities of a center between left and right ends of an image in a lower half of the image, i.e., in a range having a high possibility of containing a road surface. For example, when a plurality of road lines are detected in a preceding image, the correction region setting unit 32 designates, as a correction region, a region surrounded by the road lines. Alternatively, a position and a range of a correction region may be previously set. In this case, a correction region may be set as, for example, a region of an isosceles triangle in which a center of an image is a vertex, and a lower end of the image is a base. The correction region setting unit 32 may set a correction region in the position and the range previously set on an image.

Alternatively, the correction region setting unit 32 may set a position and a range in which a correction region is set on an image, depending on a position relationship between the vehicle 10 changing lanes and a road line crossed by the vehicle 10. By setting a correction region in this way, the correction region setting unit 32 can suitably set a correction region on an image, and therefore, it is possible to suppress false detection of a road line as another object, and false detection of another object as a road line.

Figure 4:
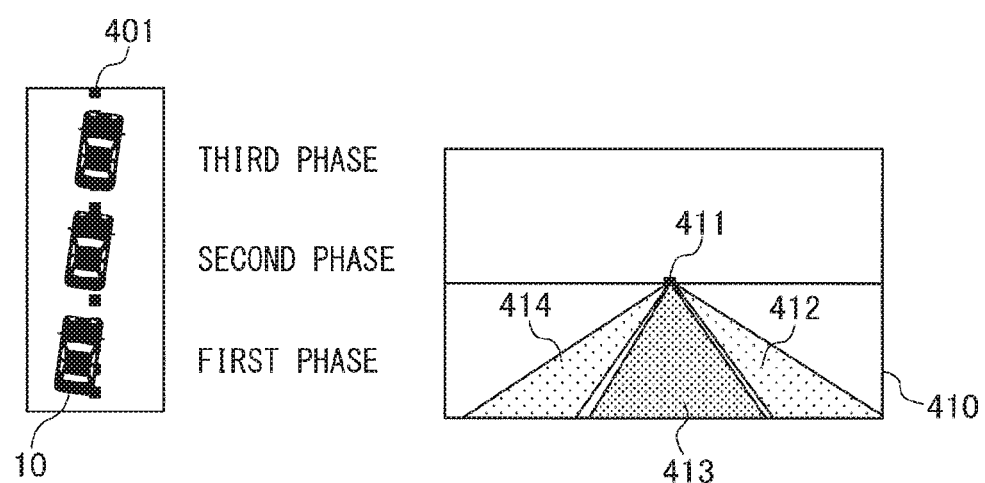
FIG. 4 is a diagram explaining an outline of setting of a correction region according to a modification example.

FIG. 4 is a diagram explaining an outline of setting of a correction region according to a modification example. In the example illustrated in FIG. 4, the vehicle 10 changes lanes from a lane on which the vehicle 10 is currently running to a right next lane. Therefore, the vehicle 10 crosses a road line 401 located on a right side of the vehicle 10 while the vehicle 10 is changing lanes. Three phases are set for a lane change; for example, a first phase from start of a lane change by the vehicle 10 to crossing of a right front end of the vehicle 10 and the road line 401, a second phase from end of the first phase to crossing of a left front end of the vehicle 10 and the road line 401, and a third phase from end of the second phase to end of the lane change of the vehicle 10.

In this case, in an image 410, regions 412 to 414 acquired by dividing a triangle in which a vanishing point 411 is a vertex, and a lower side of the image 410 is a base into three parts by lines passing the vanishing point 411 and the base are set as correction regions according to the first to third phases, respectively. Note that two road lines drawn on left and right sides of a lane are parallel, and therefore, for example, when a plurality of road lines are detected in any one of images acquired in a latest predetermined period, the correction region setting unit 32 can determine a position of an intersection of the road lines as the vanishing point 411. Alternatively, when the camera 2 is attached to the vehicle 10 in such a way that an optical axis of the camera 2 is parallel to a road surface, the correction region setting unit 32 may determine, as the vanishing point 411, a center of an image corresponding to the optical axis of the camera 2.

In the first phase, it is assumed that the road line 401 crossed by the vehicle 10 is located closer to the right side than the vehicle 10, and therefore, in the image 410, it is assumed that the road line 401 is located closer to the right side than a center of a lower end of the image 410. Thus, the correction region setting unit 32 may set the region 412 on the right side as a correction region. In the second phase, it is assumed that the road line 401 is crossing a front surface of the vehicle 10, and therefore, in the image 410, it is assumed that the road line 401 is located near the center of the lower end of the image 410. Thus, the correction region setting unit 32 may set the central region 413 as a correction region. In the third phase, it is assumed that the road line 401 is located closer to the left side than the vehicle 10, and therefore, in the image 410, it is assumed that the road line 401 is located closer to the left side than the center of the lower end of the image 410. Thus, the correction region setting unit 32 may set the region 414 on the left side as a correction region.

Note that a position of a road line on an image when the right front end of the vehicle 10 crosses the road line is already known on the basis of an attachment position and a field angle of the camera 2, etc., and therefore, a border line between the region 412 and the region 413 may be set at the position of a road line on an image when the right front end of the vehicle 10 crosses a road line. Similarly, a position of a road line on an image when the left front end of the vehicle 10 crosses the road line is already known on the basis of an attachment position and a field angle of the camera 2, etc., and therefore, a border line between the region 414 and the region 413 may be set at the position of a road line on an image when the left front end of the vehicle 10 crosses a road line.

In relation to a phase shift in a lane change, for example, when a position of a lower end of the road line 401 on an image is within a predetermined distance from a position of a lower end of a border line between the region 412 and the region 413, the correction region setting unit 32 determines that a current phase has been shifted from the first phase to the second phase. Similarly, when a position of a lower end of the road line 401 on an image is within a predetermined distance from a position of a lower end of a border line between the region 413 and the region 414, the correction region setting unit 32 determines that a current phase has been shifted from the second phase to the third phase. Alternatively, the correction region setting unit 32 may divide a section from start of a lane change of the vehicle 10 to end of the lane change into equal three parts on the basis of a trajectory to be traveled of the vehicle 10, and when a current position of the vehicle 10 represented by positioning information is included in the first section, the correction region setting unit 32 may determine that a current phase is the first phase. Similarly, when a current position of the vehicle 10 represented by positioning information is included in the second section, the correction region setting unit 32 may determine that a current phase is the second phase, whereas when a current position of the vehicle 10 represented by positioning information is included in the third section, the correction region setting unit 32 may determine that a current phase is the third phase. Alternatively, the correction region setting unit 32 may determine that a current phase is the first phase while an absolute value of a steering angle is equal to or more than a predetermined value after a lane change is started and a steering angle indicates rightward rotation, and the correction region setting unit 32 may determine that a current phase has been shifted to the second phase when an absolute value of a steering angle is less than the predetermined value. When a steering angle indicates leftward rotation, the correction region setting unit 32 may determine that a current shift has been shifted to the third phase.

Moreover, when the vehicle 10 makes a lane change from a lane on which the vehicle 10 is currently running to a left next lane, the correction region setting unit 32 may set a correction region in an order of the region 414, the region 413, and the region 412 along with a phase shift of the lane change, in an order reverse to the above-described order.

Note that the region 412 and the region 413 may be set in such a way as to partially overlap each other. Similarly, the region 413 and the region 414 may be set in such a way as to partially overlap each other.

The correction region setting unit 32 notifies the correction unit 33 of the set correction region.

The correction unit 33 corrects, for each pixel included in a correction region, a confidence score for a road line or a confidence score for another object in such a way that the confidence score for a road line calculated by the confidence calculation unit 31 is high relative to the confidence score for another object. In the present embodiment, the correction unit 33 corrects, for each pixel included in a correction region and for each object to be identified, a confidence score for the kind of the object by multiplying the confidence score for the kind of the object by a correction coefficient set for the kind of the object. In other words, a correction coefficient multiplied by a confidence score for a road line is set to be higher than a correction coefficient multiplied by a confidence score for another object. For example, a correction coefficient multiplied by a confidence score for a road line is set to a value greater than 1, and a correction coefficient multiplied by a confidence score for another object is set to 1. Alternatively, a correction coefficient multiplied by a confidence score for a road line may be set to 1, and a correction coefficient multiplied by a confidence score for another object may be set to a value smaller than 1. Further, in such a way that a confidence score for an object that tends to be erroneously recognized as a road line (e.g., a road marking other than a road line) among other objects relatively lowers more, a correction coefficient multiplied by a confidence score for the object that tends to be erroneously recognized may be set to be even lower than a correction coefficient multiplied by a confidence score for another object.

Note that the correction unit 33 may set each correction coefficient in such a way that a correction coefficient multiplied by a confidence score for a road line is higher or a correction coefficient multiplied by a confidence score for another object is lower when closer to a center of a correction region. Alternatively, depending on a position relationship between the vehicle 10 changing lanes and a road line, the correction unit 33 may set each correction coefficient in such a way that a correction coefficient multiplied by a confidence score for a road line is higher or a correction coefficient multiplied by a confidence score for another object is lower when closer to a position on an image where a road line is assumed to exist. For example, while the vehicle 10 is changing lanes, each of the correction regions 412 to 414 illustrated in FIG. 4 is set as a correction region. When a phase of a lane change is the first phase, the correction unit 33 may make a correction coefficient multiplied by a confidence score for a road line highest with regard to the correction region 412 and lowest with regard to the correction region 414. When a phase of a lane change is the third phase, the correction unit 33 may make a correction coefficient multiplied by a confidence score for a road line highest with regard to the correction region 414 and lowest with regard to the correction region 412.

For each pixel of a correction region, the correction unit 33 outputs a confidence score of each object after correction to the road line detection unit 34.

For each pixel of an image, the road line detection unit 34 determines that an object having a highest confidence score among confidence scores of the respective kinds of objects calculated with regard to the pixel is represented in the pixel. Therefore, the road line detection unit 34 determines that a road line is represented in a pixel in which a confidence score calculated with regard to a road line is higher than a confidence score calculated with regard to another object.

Figure 5:
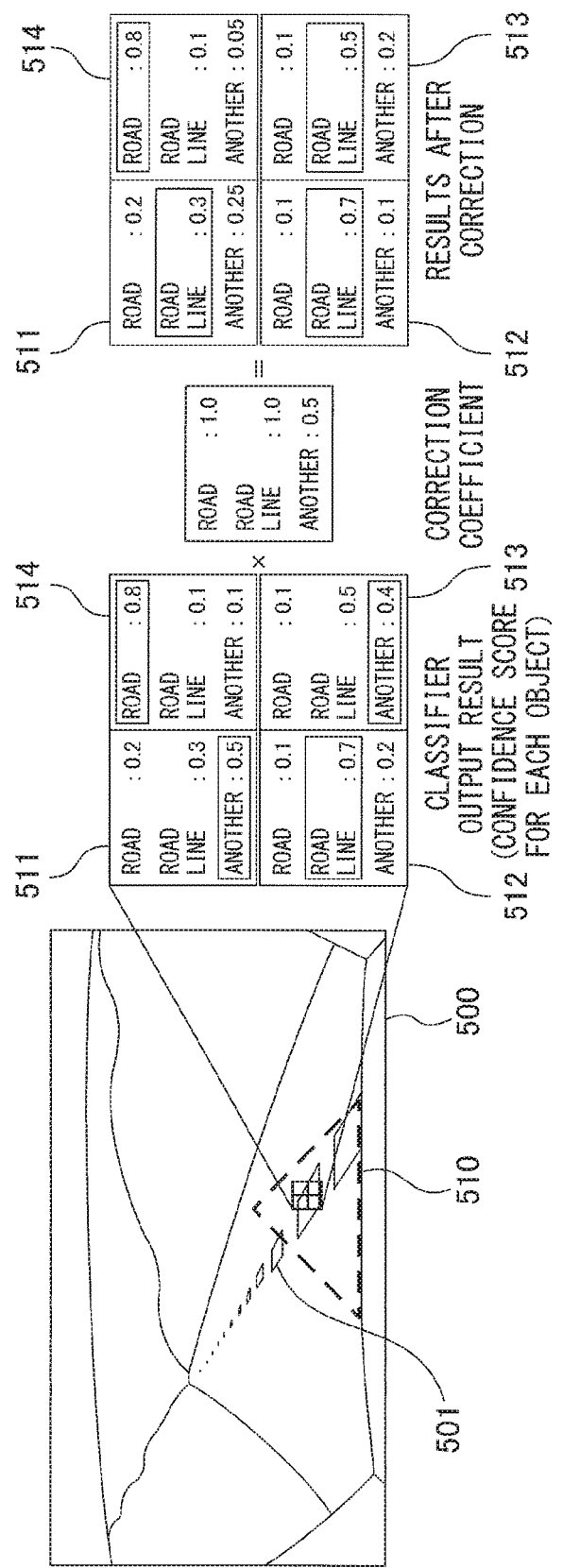
FIG. 5 is a diagram explaining an outline of road line detection processing.

FIG. 5 is a diagram explaining an outline of road line detection processing. When the vehicle 10 starts a lane change, the correction region setting unit 32 sets a correction region 510 in an image 500 acquired by the camera 2 in a range in which a road line 501 is assumed to be represented. For each of four pixels 511 to 514 in the correction region 510, a confidence score of each of a road, a road line, and another object is calculated by the confidence calculation unit 31. In this example, the road line 501 is represented in the pixels 511 to 513, and, for example, a road itself is represented in the pixel 514. While a confidence score for a road line is highest in the pixel 512, a confidence score (0.5) for another object is higher than a confidence score (0.3) for a road line in the pixel 511. Similarly, with regard to the pixel 513 as well, a confidence score for another object is higher than a confidence score for a road line.

However, for each of the pixels 511 to 514, a confidence score of each object is multiplied by a correction coefficient by the correction unit 33. In this example, correction coefficients for a road line and a road are 1.0, and a correction coefficient for another object is 0.5. In other words, a correction coefficient for a road line is set to be higher than a correction coefficient for another object. Thus, as a result of correction of the confidence scores, the confidence score for a road line is higher than the confidence score for a road and the confidence score for another object, with regard to not only the pixel 512 but also the pixel 511 and the pixel 513. Thus, it is correctly determined that a road line is represented in the pixels 511 to 513.

When the road line detection unit 34 detects a pixel representing a road line (hereinafter, referred to as a road line pixel) from an image, the road line detection unit 34 detects, as a road line, a straight line on which road line pixels are arranged. For this purpose, the road line detection unit 34 detects, as a straight line on which road line pixels are arranged, a straight line on which a predetermined number (e.g., 5 to 20) or more of road line pixels are located, for example, by executing Hough transform to a set of road line pixels, and determines the detected straight line as a road line. Note that the road line detection unit 34 may determine a road line pixel at a predetermined distance (e.g., 1 to 3 pixels) or less from a straight line of interest as a road line pixel located on the straight line of interest.

The road line detection unit 34 notifies the driving planning unit 35 of information representing the detected road line.

The driving planning unit 35 generates one or more trajectories to be traveled of the vehicle 10 in such a way that another object detected from an image and existing around the vehicle 10 does not collide with the vehicle 10. A trajectory to be traveled is represented as, for example, a set of target positions for the vehicle 10 at the respective times from the current time to a certain time later. For example, the driving planning unit 35 determines that the vehicle 10 is running on a lane identified by two road lines located adjacent to each other across the vehicle 10. Further, the driving planning unit 35 determines that an another object detected from an image is running on a lane identified by two road lines located adjacent to each other across a central position of the other object in a horizontal direction. Then the driving planning unit 35 may determine whether or not the lane on which the vehicle 10 is running is the same as the lane on which the other object is running.

Each time the driving planning unit 35 receives an image from the camera 2, the driving planning unit 35 converts the received image into a bird's-eye image by executing viewpoint conversion processing by using information such as a position of attachment of the camera 2 to the vehicle 10. The driving planning unit 35 tracks, by executing tracking processing using a Kalman filter or the like on a series of bird's-eye images, a detected object with regard to each image, and estimates, based on the path obtained from the tracking result, a trajectory for each object up to a certain time later.

On the basis of the lane on which a detected another object is running, and the estimated trajectory, the driving planning unit 35 generates a trajectory to be traveled of the vehicle 10 in such a way that the other object and the vehicle 10 run on different lanes or a relative distance from the vehicle 10 to the other object is equal to or more than a predetermined distance. In this instance, for example, with reference to current position information of the vehicle 10 acquired from the positioning information receiver 3, and map information stored in the memory 22, the driving planning unit 35 may confirm a number of lanes on which the vehicle 10 can run. When a plurality of lanes on which the vehicle 10 can run exist, the driving planning unit 35 may generate a trajectory to be traveled in such a way as to change the lane on which the vehicle 10 runs.

Note that the driving planning unit 35 may generate a plurality of trajectories to be traveled. In this case, among the plurality of trajectories to be traveled, the driving planning unit 35 may select a trajectory in which a sum of absolute values of acceleration of the vehicle 10 becomes minimum.

The driving planning unit 35 notifies the vehicle control unit 36 of the generated trajectory to be traveled.

The vehicle control unit 36 controls each unit of the vehicle 10 in such a way that the vehicle 10 runs along the informed trajectory to be traveled. For example, the vehicle control unit 36 calculates a target acceleration of the vehicle 10 according to the informed trajectory to be traveled, and a current speed of the vehicle 10 measured by a vehicle speed sensor (not illustrated), and sets an accelerator position or a brake pedal position in such a way as to achieve the target acceleration. The vehicle control unit 36 then calculates an amount of fuel consumption according to the set accelerator position, and outputs a control signal corresponding to the amount of fuel consumption to a fuel injection device of an engine of the vehicle 10. Alternatively, the vehicle control unit 36 outputs a control signal corresponding to the set brake pedal position to a brake of the vehicle 10.

Furthermore, when the vehicle 10 changes its course in order to travel along a trajectory to be traveled, the vehicle control unit 36 calculates a target steering angle for the vehicle 10 according to the trajectory to be traveled, and outputs a control signal corresponding to the target steering angle to an actuator (not illustrated) that controls a steering wheel of the vehicle 10.

FIG. 6 is a flowchart illustrating an operation of vehicle control processing including road line detection processing executed by the processor 23. Each time the processor 23 receives an image from the camera 2, the processor 23 executes vehicle control processing in accordance with the operation flowchart illustrated in FIG. 6. Note that in the operation flowchart presented below, processing steps from step S101 to step S106 correspond to the road line detection processing.

By inputting an image acquired from the camera 2 to a classifier, the confidence calculation unit 31 of the processor 23 calculates a confidence score for each kind of an object for each pixel (step S101).

The correction region setting unit 32 of the processor 23 determines whether or not the vehicle 10 is changing lanes (step S102). During changing lanes (Yes in step S102), the correction region setting unit 32 sets a correction region in a region in which a road line is assumed to be represented on an image (step S103).

The correction unit 33 of the processor 23 corrects, for each pixel included in the correction region, a confidence score for a road line or a confidence score for another object in such a way that the confidence score for a road line is high relative to the confidence score for another object (step S104).

After the step S104 or when the vehicle 10 is not changing lanes in the step S102 (No in step S102), the road line detection unit 34 of the processor 23 determines, for each pixel of an image, that an object whose confidence score is maximum is represented in the pixel. In other words, the road line detection unit 34 detects, as a road line pixel representing a road line, a pixel in which a confidence score for a road line is higher than a confidence score for another object (step S105). The road line detection unit 34 detects, as a road line, a straight line on which road line pixels are arranged, i.e., a straight line on which a predetermined number or more of road line pixels are located (step S106).

The driving planning unit 35 of the processor 23 identifies a lane on which the vehicle 10 is running based on the road line detected from the image, and generates a trajectory to be traveled of the vehicle 10 on the basis of the identified lane (step S107). The vehicle control unit 36 of the processor 23 controls the vehicle 10 in such a way that the vehicle 10 runs along the trajectory to be traveled (step S108). Then the processor 23 ends the vehicle control processing.

As has been described above, when a vehicle is changing lanes, this road line detection device sets, as a correction region, a region in which a road line is assumed to be represented in an image generated by a camera mounted on a vehicle, and for each pixel in the correction region, corrects a confidence score for each kind of an object calculated by inputting an image to a classifier for segmentation in such a way that a confidence score for a road line becomes relatively higher. Then, this road line detection device detects, as a pixel representing a road line, a pixel in which a confidence score for a road line is higher than a confidence score for another object. Thus, even when a road line is represented in a region in which no road line exists on an image acquired while a vehicle is running on a lane, this road line detection device can suppress unsuccessful detection of a road line. As a result, this road line detection device is able to improve accuracy in detection of a road line marked on a road.

Furthermore, a computer program that implements a function of each unit of the processor 23 of the road line detection device according to the above-described embodiment or modification example may be provided in a form of being recorded in a computer-readable portable recording medium such as a semiconductor memory, a magnetic recording medium, or an optical recording medium.

As described above, those skilled in the art may make various changes in conformity to an embodiment within the scope of the present invention.

What is claimed is:

1. A road line detection device comprising:
a processor configured to:
input an image, including a plurality of pixels, acquired by a camera mounted on a vehicle to a classifier that calculates for each the plurality of pixels of the image, a confidence score that an object represented in a pixel is a road line and a confidence score that the object represented in the pixel is another object;
set a correction region in a range assumed to include a road line in the image when the vehicle changes lanes;
correct, for each pixel included in the correction region, the confidence score for a road line or the confidence score for another object in such a way that the confidence score for a road line is higher than the confidence score for another object;
detect, among the plurality of pixels of the image, a pixel in which the confidence score for a road line is higher than the confidence score for another object; and
detect, as a road line, a straight line on which detected pixels are arranged.

2. The road line detection device according to claim 1, wherein the processor is further configured to set a position and a range of the correction region on the image depending on a position relationship between a road line crossed by the vehicle when the vehicle changes lanes, and the vehicle.

3. A road line detection method comprising:
inputting an image, including a plurality of pixels, acquired by an imaging unit mounted on a vehicle to a classifier that calculates for each of the plurality of pixels of the image, a confidence score that an object represented in the pixel is a road line and a confidence score that the object is another object;
setting a correction region in a range assumed to include a road line in the image when the vehicle changes lanes;
correcting, for each pixel included in the correction region, the confidence score for a road line or the confidence score for another object in such a way that the confidence score for a road line is higher than the confidence score for another object;
detecting, among the plurality of pixels of the image, a pixel in which the confidence score for a road line is higher than the confidence score for another object; and
detecting, as a road line, a straight line on which detected pixels are arranged.

* * * * *